Figure 1:
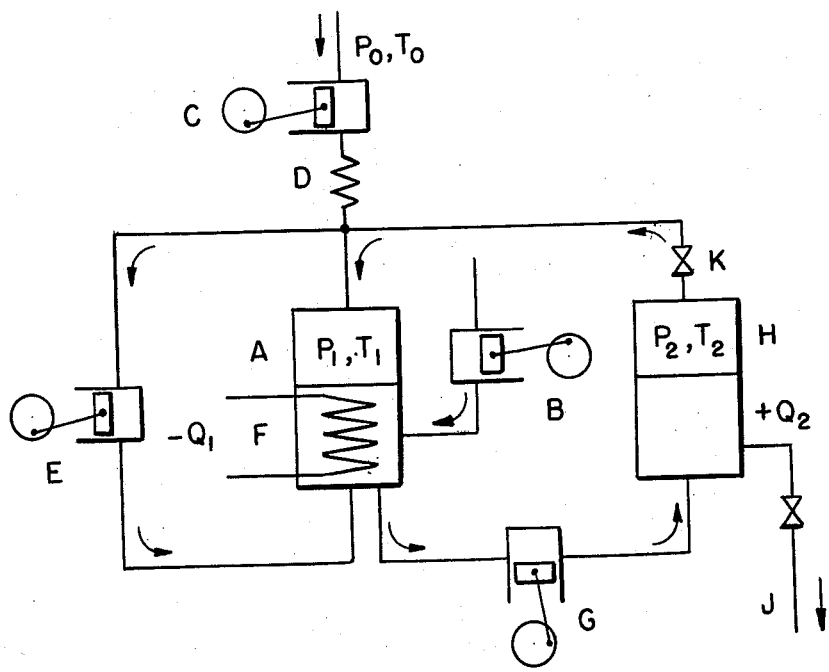

Feb. 19, 1963    K. WISSEROTH ET AL    3,078,261
WITHDRAWAL OF REACTION HEAT
Filed Aug. 5, 1957    2 Sheets-Sheet 1

INVENTORS:
KARL WISSEROTH
ERNST-GUENTHER KASTNING
BY
ATT'YS

Feb. 19, 1963     K. WISSEROTH ET AL     3,078,261
WITHDRAWAL OF REACTION HEAT
Filed Aug. 5, 1957     2 Sheets-Sheet 2

INVENTORS:
KARL WISSEROTH
ERNST-GUENTHER KASTNING
ATT'YS 3,078,261
WITHDRAWAL OF REACTION HEAT
Karl Wisseroth and Ernst-Guenther Kastning, Ludwigshafen (Rhine), Germany, assignors to Badische Anilin- & Soda-Fabrik Aktiengesellschaft, Ludwigshafen (Rhine), Germany
Filed Aug. 5, 1957, Ser. No. 676,226
Claims priority, application Germany Aug. 16, 1956
1 Claim. (Cl. 260—92.1)

This invention relates to a process for withdrawing the reaction heat in polymerization reactions.

Various methods have already been proposed for the withdrawal of reaction heat in reactions which proceed rapidly and with the evolution of much heat, for example in continuous polymerization processes. In the polymerization of liquid monomers, so-called boiling agents are used, i.e. liquid diluents or solvents which withdraw heat by evaporation under the pressure and temperature conditions of the polymerization, and are returned to the reaction mixture after condensation against a cooling surface.

In another method, the polymerization heat is removed from the reaction zone according to the compression refrigerator principle with the simultaneous use of the reactants, for example the ethylene to be polymerized.

We have now found that polymerization reactions which proceed rapidly and with strong evolution of heat can be realized in a simple way by introducing into the reaction chamber a preferably cooled solution of a gas in a solvent in which it dissolves with evolution of heat and allowing the gas to escape during the course of the reaction by decompression, whereby the escaping gas carries away the reaction heat. The gas serving as heat carrier can also be an active participant in the reaction, for example the olefine itself in the polymerization of a gaseous olefine. In this case the olefine is led into the solvent and the heat of solution is withdrawn by cooling before the polymerization.

The use of this process is especially recommended in the case of relatively high reaction pressures. In this case the use of special boiling agents in the form of liquid diluents or solvents is unsuitable, especially when the reaction temperature, for example with regard to catalytic processes, is not sufficiently high in order to render possible a withdrawal of heat by conduction by reason of sufficient temperature differences between reactor and cooler. Although the process according to this invention can be generally used, it offers special advantages in rapidly proceeding polymerization reactions. It is suitable above all for withdrawing the polymerization heat of monomers which are gaseous under normal conditions, i.e. atmospheric pressure and 20° C., for example ethylene, propylene, isobutylene, vinyl chloride or fluorinated ethylenes. In particular in the low pressure polymerization of ethylene it is possible with the aid of this process to control completely the withdrawal of heat and very high space-time yields are therefore obtained. In practical use the process in accordance with our invention is applicable to all types of processes for the polymerization of ethylene, for example those referred to in the book by Raff and Allison "High polymers," vol. XI, Polyethylene, New York and London 1956, (cf. pages 51 to 55, 59 to 81 and 82 to 87).

One method of carrying out the process of the invention in polymerization reactions will now be described with reference to the accompanying drawings.

Figure 2:
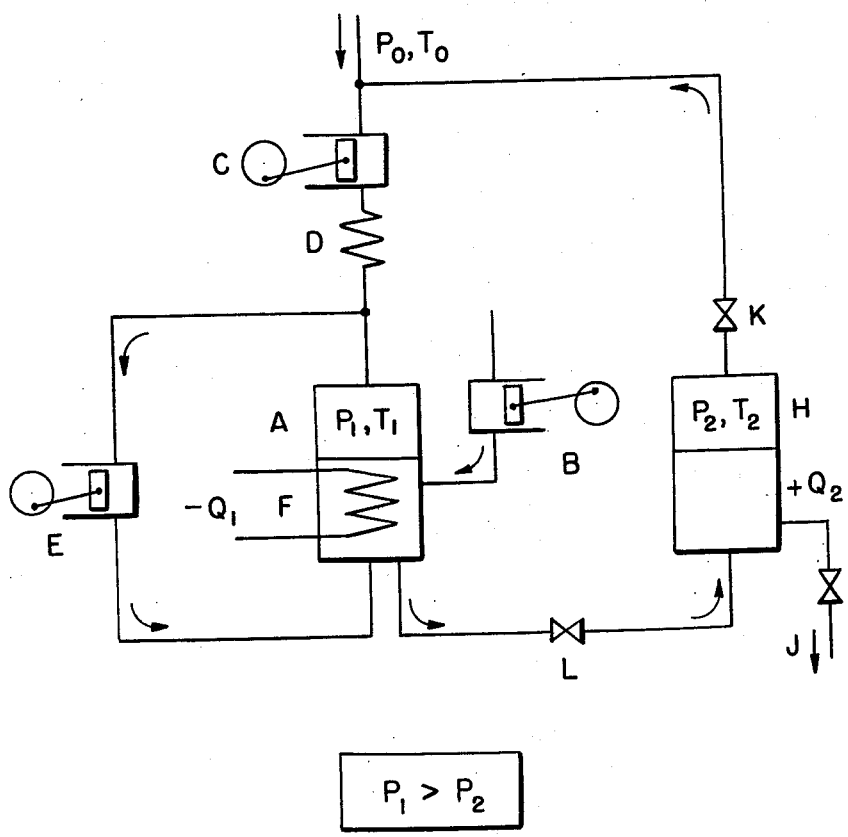

Referring to FIGURE 1, solvent, if desired with the addition of dissolved or dispersed catalyst, is continually supplied to a pressure-stable reservoir A by a conveyor pump B, while at the same time the monomer of original normal pressure $P_0$ and room temperature $T_0$ is supplied through a gas compressor C after leading away the adiabatic compression heat in a heat exchanger D. A gas circulating pump E provides for sufficient mixing movement to ensure the attainment of solution equilibrium under the pressure $P_1$ and at the temperature $T_1$. The heat of solution $-Q_1$ formed during the solution process is led away through a cooler F situated in the solution. The conveyor pump G, which overcomes the pressure difference $P_2-P_1$, continuously introduces saturated solution to an extent which substantially exceeds the requirement of monomers for the polymerization into the reactor H, while at the same time a part of the reaction mixture is continuously withdrawn through J. Under pressure $P_2$ and temperature $T_2$ conditions in the reactor, there escapes by degasification a considerable amount of the dissolved monomers with an absorption of heat $+Q_2$ from the solution and is decompressed through a throttle valve K to the pressure of the reservoir and supplied to this again so that in all a transfer of heat has taken place from the reactor to the reservoir. In so far as $P_1$ is greater than $P_2$, the pressure difference can be used for conveyance and a valve L inserted instead of the conveyor pump G (see FIGURE 2). The monomers escaping by the degasification in the reactor are in this case decompressed to the original pressure $P_0$ and supplied for re-employment to the low pressure side of the initial compressor as shown diagrammatically in FIGURE 2.

The process according to this invention is not limited to the embodiment illustrated but can be used fundamentally in all processes of which the characterising feature is the withdrawal of reaction heat by gassing out normally gaseous substances which have been dissolved in the reaction mixture with appreciable heat of solution.

The following examples will further illustrate this invention but the invention is not restricted to these examples. The parts specified in the examples are parts by weight.

*Example 1*

From a reservoir which contains a solution of ethylene in benzene saturated at room temperature and 60 atmospheres ethylene pressure and also, as catalyst, 0.1 part of alpha.alpha'-azo-bis-isobutyronitrile dissolved in 100 parts of benzene, there are continuously supplied per hour by a conveyor pump 104 parts of the saturated solution to the reaction vessel at the reaction temperature of 80° C. and under a pressure of 100 atmospheres. To withdraw the polymerization heat, about 20 parts of ethylene are gassed out continuously per hour by decompression to the pressure of the reservoir, and at the same time returned in circulation for reuse in the production of the saturated solution. About 49 parts of benzene per hour as well as about 5 parts of waxy polyethylene are withdrawn in the form of a pasty suspension. The process can be carried out in the same way when instead of alpha. alpha-azo-bis-isobutyronitrile benzoyl peroxide or other peroxides are used as catalysts for the polymerization of ethylene.

*Example 2*

A saturated solution of ethylene in cyclohexane is continuously prepared in a pressure container at room temperature and 50 atmospheres ethylene pressure. The heat of solution set free is withdrawn through a cooling system. While utilizing the pressure difference for conveyance, the saturated solution is supplied through a throttle at room temperature and 30 atmospheres ethylene pressure to a reactor. At an external level control, it is continually ensured that in the solution container the level of the saturated solution remains constant with regard to the continuous hourly inflow of about 85 parts of fresh cyclohexane. By separate pipes there are supplied to the reaction per hour 0.05 part each of normal amyl sodium suspended in 10 parts of cyclohexane and 0.05 part of titanium tetrachloride dissolved in 5 parts of cyclohexane. Each hour there are continually gassed out about 40 parts of ethylene by decompression and returned for re-employment in the production of the saturated solution. Each hour there are obtained about 100 parts of cyclohexane and about 10 parts of very high molecular weight linear polyethylene as a pasty suspension.

We claim:

In a continuous process for carrying out a rapid exothermic polymerization of a normally gaseous monomer selected from the group consisting of ethylene, propylene, isobutylene, vinyl chloride, and fluorinated ethylene, the improvement for withdrawing the exothermic heat of polymerization from the reaction vessel and for controlling the reaction temperature which comprises: dissolving said normally gaseous monomer in a polymerization solvent in a reservoir zone separated from said reaction vessel, the resulting solution having the property of releasing said gaseous monomer endothermically; passing said solution through a heat exchanger to withdraw the heat of solution caused by dissolving said gaseous monomer in said solvent; passing said solution into said reaction vessel, the amount of said monomer dissolved in said solution which passes into said reaction vessel being substantially in excess of the amount of monomer polymerized within said reaction vessel, said reaction vessel being divided into a liquid zone and a gaseous zone above said liquid zone; degasifying a portion of said monomer from said solution in said reaction vessel by heat from said exothermic polymerization reaction; venting the evolved monomer gas from the gaseous zone of said reaction vessel through a valve to remove said gas from said reaction vessel, whereby heat is withdrawn from said reaction vessel as heat content of said evolved gas; continuously returning said monomer gas to said reservoir zone; and continuously withdrawing a portion of the reaction mixture from the reaction vessel.

References Cited in the file of this patent
UNITED STATES PATENTS

| | | |
|---|---|---|
| 1,325,666 | Crawford | Dec. 23, 1919 |
| 2,255,414 | Coons | Sept. 9, 1941 |
| 2,414,311 | Larson | Jan. 14, 1947 |
| 2,479,360 | Howard | Aug. 16, 1949 |
| 2,531,373 | Waterman | Nov. 21, 1950 |
| 2,731,452 | Field et al. | Jan. 17, 1956 |
| 2,780,617 | Zletz | Feb. 5, 1957 |
| 2,825,721 | Hogan et al. | Mar. 4, 1958 |
| 2,899,417 | Hooker | Aug. 11, 1959 |
| 2,918,460 | Schappert | Dec. 22, 1959 |